United States Patent Office 3,646,058
Patented Feb. 29, 1972

3,646,058
3-AMINO-4,4-DIHALO-5-PYRAZOLONES
Daniel Bertin, Montrouge, and Pierre Girault, Paris, France, assignors to Roussel-UCLAF, Paris, France
No Drawing. Filed Oct. 28, 1969, Ser. No. 871,959
Claims priority, application France, Nov. 7, 1968, 172,931
Int. Cl. C07d 49/16
U.S. Cl. 260—310 A                                    2 Claims

ABSTRACT OF THE DISCLOSURE 3-amino-4,4-disubstituted-5-pyrazolones of the formula

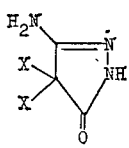

(I)

wherein X is chlorine or bromine, and their acid, addition salts, which possess antibacterial activity, process for their preparation, antibacterial compositions containing them, and their use.

PRIOR ART

U.S. Pat. No. 2,899,443 describes a process for halogenating a 1,3-disubstituted-5-pyrazolone in order to obtain compounds which are used as couplers in color photography.

Belgian Pat. No. 725,968 describes the preparation of 1-substituted-4,4-dihalo-5-pyrazolones and their use in agriculture for controlling fungi in the soil or in seeds.

The 4,4-dihalo-5-pyrazolones of the invention, which are not substituted in the 1-position, are endowed with a valuable antibacterial activity while having a low toxicity against warm-blooded animals, which makes them particularly suitable for controlling bacteria in industrial liquids.

OBJECTS OF THE INVENTION

It is an object of the invention to provide the novel 3-amino-4,4-dihalo-5-pyrazolones of Formula I.

It is another object of the invention to provide a process for the preparation of the pyrazolone derivatives of Formula I.

It is a further object of the invention to provide novel antibacterial compositions.

It is an additional object of the invention to provide a novel method for controlling bacteria in industrial liquids.

These and other objects and advantages of the invention will become obvious from the following detailed description.

THE INVENTION

The inveniton relates to novel 3-amino-4,4-disubstituted-5-pyrazolones of the formula

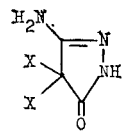

(I)

wherein X is a halogen atom selected from the group consisting of chlorine and bromine, and their acid addition salts.

The acid addition salts of the compounds of Formula I may be derived from mineral acids, such as hydrochloric, hydrobromic or sulfuric acid, or from organic acids, such as benzenesulfonic or p-toluenesulfonic acid.

The novel pyrazolones of Formula I possess a valuable antibacterial activity which makes them particularly suitable for controlling bacteria in industrial wastes and aqueous liquids used in industry. They have the advantage of being very little toxic towards warm-blooded animals and humans. For example, 3-amino-4,4-dichloro-5-pyrazolone was found to have and $LD_{50}$ of between 0.5 and 1 gm./kg. in mice. $LD_{50}$ is a dose which is lethal to 50% of the animals being treated.

The pyrazolones of Formula I have also been found to be useful in the preservation of pharmaceutical products or compositions.

The process of the invention for the preparation of the pyrazolones of Formula I comprises reacting a 3-amino-5-pyrazolone of the formula

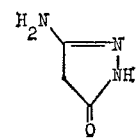

(II)

with a hologenating agent selected from the group consisting of a chlorinating agent and a brominating agent, and recovering a 3-amino-4,4-dihalo-5-pyrazolone of the Formula I, optionally in the form of a corresponding acid addition salt.

Preferably, the chlorinating agent is chlorine, the brominating agent is bromine, and the halogenation reaction is conducted in an organic solvent. Said organic solvent is advantageously selected from the group consisting of acetic acid, carbon tetrachloride, carbon disulfide and chloroform.

The acid addition salts of the compounds of Formula I are prepared according to conventional methods.

The preparation of the starting compound of Formula II as described by Toshiyasu Ishirmaru, Yakugaka, Zasshi, 77, 796 (1957); Chemical Abstracts, 51, 17892.

As has been previously indicated the novel pyrazolones of Formula I and their acid addition salts exhibit marked antibacterial properties and may be utilized in industry to combat and destroy bacteria which usually develop in aqueous liquids used for various industrial purposes.

The invention thus provides a method of controlling bacteria in industrial aqueous liquids and wastes which comprises adding to said industrial aqueous liquids and wastes a bactericidally effective amount of at least one compound of the Formula I.

This method is particularly suitable for preventing or eliminating the formation of slime in liquids used in paper manufacture. The method may also be used for the preservation of paper pulp.

Another example of the use of the new method is in the field of tanning industry, where vegetable-tanning liquors and leathers are likely to become damaged by the growth of bacteria.

It is not intended that the method of the invention be limited to any particular concentration range of active material. The concentration range is that range necessary to accomplish the desired end. A preferred concentration range of active material in the liquids to be treated is between 5 and 250 parts per million.

The method of the invention is applied in any conventional manner, for example by adding a composition containing active material to the liquid to be treated, or by spraying a liquid composition, and dispersing the active material with agitation.

The method of the invention is preferably performed by using the compounds of Formula I, or their acid addition salts, in the form of a composition with a suitable adjuvant.

The antibacterial compositions of the invention comprise: (a) as active ingredient from 10 to 90% by weight of at least a member selected from the group consisting of a compound of Formula I and an acid addition salt thereof, and (b) an adjuvant. Said adjuvant is for example a cationic, anionic or non-ionic surface-active agent, which causes the compositions to be easily dispersed in the liquids to be treated. Such surface-active agents include polyoxyethylene derivatives, aromatic sulfonates such as aryl- or alkylarylsulfonates, e.g. sodium naphthalene sulfonate, and the like. The said adjuvant may also comprise an inert carrier in the form of a powder, such as talc, clays, silicates, kieselguhr, or a liquid vehicle, such as water, aliphatic alcohols, hydrocarbons, mineral, animal or vegetable oils, or any other suitable organic solvent or dispersing agent.

The compositions of the invention are in the form of wettable powders, suspensions, emulsions or solutions.

In addition to the pyrazolones of Formula I, the compositions of the invention may also contain one or several other pesticidal agents.

The following examples illustrate the invention without limiting it in any respect.

EXAMPLE 1

Preparation of 3-amino-4,4-dichloro-5-pyrazolone 100 mg. of 3-amino-5-pyrazolone were introduced into 300 cc. of acetic acid. Then 150 gm. of gaseous chlorine were allowed to bubble into the reaction mixture while agitating for one hour at room temperature. The precipitate thus formed was separated by suction-filtering, washed with water and dried to obtain 143 gm. of 3-amino-4,4-dichloro-5-pyrazolone having a melting point of 220°–222° C. (with decomposition), which remained unchanged upon recrystallization from methanol.

The product is moderately soluble in water, ethanol and acetone, and insoluble in ethyl ether, benzene and chloroform.

*Analysis.*—Calculated for $C_3H_3Cl_2N_3O$; molecular weight: 167.98 (percent): C, 21.44; H, 1.80; Cl, 42.21; N, 25.01. Found (percent): C, 21.6; H, 2.0; Cl, 42.2; N, 24.9.

As far as is known, this compound is not described in the literature.

EXAMPLE 2

Wettable powder composition

| | Parts by wt. |
|---|---|
| 3-amino-4,4-dichloro-5-pyrazolone | 25 |
| Sodium naphthalenesulfonate condensation product | 15 |
| Sodium alkylnaphthalene sulfonate | 0.5 |
| Synthetic hydrated silica | 34.5 |
| Colloidal kaolin | 25 |
| | 100 |

BIOLOGICAL DATA

Bactericidal activity of 3-amino-4,4-dichloro-5-pyrazolone in reconstituted pulp 9.7 liters of paper pulp containing 12.5 gm./l. of pulp fibers were prepared. 200 cc. of 2% resin glue were added thereto. The suspension was contaminated with 100 cc. of inoculum of Aerobacter aerogenes and was then incubated at 35° C. under agitation.

After 20 hours of incubation samples of the suspension were used to determine the number of germs per cc. of suspension. Then varying amounts of the product to be tested were introduced into the samples. This operation is hereinafter referred to as the "treatment." The samples were then incubated again. Germ counts were made at specific intervals of time.

One day after treatment, the volume of each sample was adjusted with sterile water, and each sample was contaminated again with the same volume of an inoculum of *Aerobacter aerogenes*. Germ counts were made at specific intervals of time after recontamination.

One day after recontamination, the same operation was repeated.

The results which are expressed in percent of mortality calculated on starting populations, are summarized in Table I.

TABLE I

| Time after treatment in hours | Concentration of bactericidal material in p.p.m. | | |
|---|---|---|---|
| | 200 | 100 | 50 |
| 1 | 80.2 | 0 | 0 |
| 4 | 99.8 | 76.7 | 43.6 |
| 7 | 100 | 95.3 | 62.5 |
| 23 | 100 | 100 | 100 |
| 24 hrs., first recontamination | | | |
| 25 | 99.9 | 99.8 | 99.5 |
| 28 | 100 | 100 | 99.2 |
| 31 | 100 | 100 | 100 |
| 47 | 100 | 100 | 100 |
| 48 hrs., second recontamination | | | |
| 49 | 99.6 | 99.5 | 99.4 |
| 52 | 100 | 99 | 99.8 |
| 55 | 100 | 100 | 99.9 |

Table I shows that the tested compound provides an effective and persistent control of bacteria in liquids analogous to those used in paper manufacture.

Various modifications of the process, compositions and method of the invention may be made without departing from the spirit or scope thereof.

We claim:
1. A compound selected from the group consisting of:
(a) a 3-amino-4,4-disubstituted-5-pyrazolone of the formula

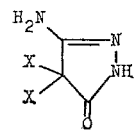

wherein X is a halogen selected from the group consisting of chlorine and bromine, and
(b) its antibacterial acid addition salts.

2. A compound of claim 1 which is 3-amino-4,4-dichloro-5-pyrazolone.

References Cited

UNITED STATES PATENTS

| 2,899,443 | 8/1959 | Schulze | 260—310 A |
| 3,006,759 | 10/1961 | Loria et al. | 260—310 A |

FOREIGN PATENTS

| 6,707,544 | 11/1967 | Netherlands | 260—310 A |

OTHER REFERENCES

Westöö: Acta. Chem. Scand., vol. 6, pt. 2, pp. 1499–1515 (1952) QD1.A32.

Wiley et al.: Pyrazolones, Pyrazolidines and Derivatives, pp. 81–3 and 344–5, N.Y., Interscience, Wiley, 1964, QD401.W5.

NATALIE TROUSOF, Primary Examiner

U.S. Cl. X.R.

21—58; 162—161; 210—62; 424—273